United States Patent [19]

Pfertzel et al.

[11] Patent Number: 4,820,426

[45] Date of Patent: Apr. 11, 1989

[54] PROCESS FOR THE PROCESSING OF FLUIDS CONTAINING SUSPENDED PARTICLES

[75] Inventors: Roger Pfertzel, Gif sur Yvette; Maurice Quenault, Paris, both of France

[73] Assignee: Societe Technique Pour l'Energie Atomique Technicatome, Paris, France

[21] Appl. No.: 29,754

[22] Filed: Mar. 24, 1987

[30] Foreign Application Priority Data

Apr. 4, 1986 [FR] France ................................ 86 04843

[51] Int. Cl.[4] ........................ B01D 37/04; B01D 46/00

[52] U.S. Cl. .................................... 210/779; 210/790; 210/805; 55/97

[58] Field of Search ............... 210/779, 790, 805, 806; 55/89, 97

[56] References Cited

U.S. PATENT DOCUMENTS

| | | | |
|---|---|---|---|
| 3,486,621 | 12/1969 | Hirs | 210/779 X |
| 3,679,051 | 7/1972 | Larson et al. | 210/790 X |
| 3,792,773 | 2/1974 | Ross | 210/779 X |
| 3,962,078 | 6/1976 | Hirs | 210/27 |
| 4,372,859 | 2/1983 | Sugimoto et al. | 210/790 X |
| 4,684,494 | 2/1987 | Dagard | 210/779 X |

FOREIGN PATENT DOCUMENTS 1379283 12/1963 France .

*Primary Examiner*—Tom Wyse
*Attorney, Agent, or Firm*—Pearne, Gordon, McCoy & Granger

[57] ABSTRACT

The invention relates to a process and an apparatus for the processing or treatment of fluids containing suspended particles and more particularly usable for the processing or treatment of gases and liquids contaminated by radioactive particles.

The fluid to be treated undergoes a treatment cycle in the circuit. This cycle comprises a filtering stage performed in the filtering apparatus in order to extract part of the fluid in the purified state and a separating stage performed in the separating device for extracting part of the particles present in suspended form in the fluid. It is possible to commence the processing cycle either by the filtering stage, or by the separating stage. The particle-depleted fluid from the separating stage or the particle-enriched fluid from the filtering stage undergoes a further processing cycle after adding thereto fluid to be treated by means of the pipe.

Filtration is performed in an apparatus subdivided into two compartments by porous, permeable walls, while circulating the fluid in the first compartment. This manner of operation makes it possible to avoid the clogging of the filtering apparatus.

7 Claims, 3 Drawing Sheets

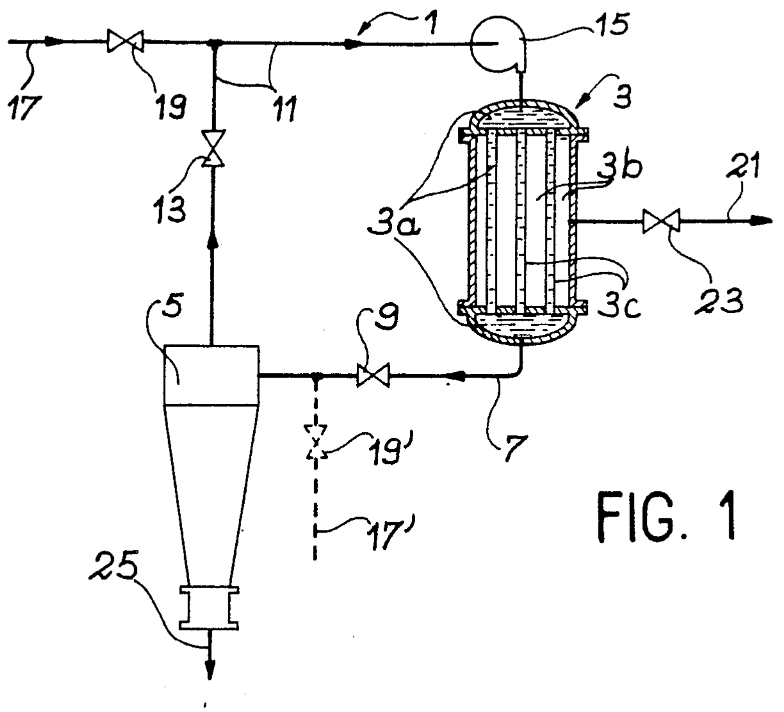
FIG. 1
FIG. 3
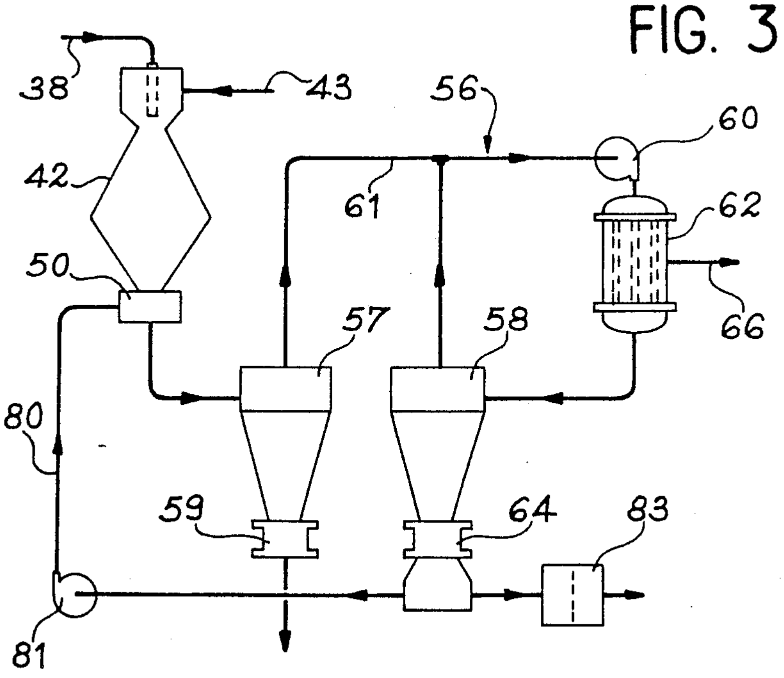

PROCESS FOR THE PROCESSING OF FLUIDS CONTAINING SUSPENDED PARTICLES

BACKGROUND OF THE INVENTION

The invention relates to a process for the processing of fluids containing suspended particles. More specifically it relates to the elimination of particles suspended in gases or liquids and specifically to the elimination of very fine particles, whose dimensions can be as small as 0.01 μm.

When the fluid is a gas, said particles can be constituted by aerosols, fine powders, ash, etc. In particular, gases containing suspended particles of this type are found in the internal atmospheres of nuclear or non-nuclear installations, e.g. in reactors, plants and laboratories, in installations for incinerating radioactive or non-radioactive waste, in liquid drying installations and all dust-containing installations.

When the fluid is a liquid, the particles can be constituted by insoluble matter, such as fine powders, e.g. powders of metallic oxides, colloidal particles, etc.

Examples of liquids containing particles of this type in suspension are liquid effluents and waste materials produced in nuclear power stations, nuclear plants and numerous industrial installations.

The presently most widely used process for processing fluid of this type consists of filtering them by passing through filtering elements having sufficiently fine mesh sizes to hold back the particles. However, with such a procedure, there is a progressive clogging of the filter, which leads to a variation in the operating characteristics of the filtering circuit and requires the periodic replacement of clogged filtering elements or the putting into operation of a countercurrent declogging stage by injecting pressurized fluid.

The replacement of the filters constitutes a serious disadvantage, particularly when the filtered particles are radioactive. Thus, due to the radioactivity deposited on these filters, safety problems are caused in the handling thereof for the purpose of obviating contamination and irradiation risks. Moreover, they must be conditioned in tight matrixes, such as of concrete, bitumen or thermosetting resins to enable the long-term storage thereof, which has the effect of diluting the radioactive dust in an inert material of very significant volume and thus increasing the volume of the waste. The variant consisting of declogging the filters by injecting pressurized fluid makes it possible to obviate this disadvantage, but is complex and difficult to perform.

To obviate this situation, consideration has been given to the treatment of the fluids by using cyclone separators or electrostatic filters, in order to eliminate the particles contained therein, but such devices have an inadequate stopping power with respect to such particles.

The present invention specifically relates to a process for the processing or treatment of fluids containing suspended particles and which obviates the aforementioned disadvantages.

According to the invention, the fluid to be processed undergoes a processing cycle comprising a filtering stage in order to extract part of the fluid in the purified state and a separation stage for extracting part of the particles present in suspension in the fluid, the processing cycle being started either by the filtering stage, or by the separating stage, and subjecting the particle-depleted fluid from the separating stage or the particle-enriched fluid from the filtering stage to a further processing cycle after adding thereto fluid to be processed.

For the performance of the processing or treatment cycle, the choice of the first stage is more particularly dependent on the particle concentration of the fluid to be processed.

Thus, if the fluid to be processed has a high particle concentration, preference is given to starting with the separating stage. In this case, the process consists of subjecting said fluid to a processing cycle comprising the following stages :

(a) a separating part of the particle present in the fluid to be processed in order to reduce the number of particles therein, (b) circulating the resulting fluid in the first compartment of a filtering apparatus subdivided into first and second compartments by at least one porous, permeable wall having pores with dimensions smaller than those of the particles, so that at the outlet from said first compartment particle-enriched fluid is obtained and purified fluid is diffused into the second compartment, (c) recovering the purified fluid which has diffused into the second compartment and (d) recycling the particle-enriched fluid leaving the first compartment in order to subject it to a further processing cycle with the fluid to be processed.

Conversely, when the fluid to be processed has a relatively small particle concentration, preference is given to starting the processing cycle with the filtering stage. In this case, the process consists of subjecting the fluid to a processing cycle comprising the following stages:

(a') circulating the fluid to be processed in the first compartment of a filtering apparatus subdivided into first and second compartments by at least one porous, permeable wall having pores of sizes smaller than those of the particles, in order to obtain at the outlet of said first compartment particle-enriched fluid and purified fluid is diffused into the second compartment, (b') recovering the purified fluid which has diffused into the second compartment, (c') separating part of the particle present in the fluid leaving the first compartment in order to bring about particle depletion thereof and (d') recycling the thus depleted fluid in order to subject it to a further processing cycle with the fluid to be processed.

In these two embodiments of the inventive process, the porous, permeable walls of the filtering apparatus are generally constituted by tubes within which is circulated the fluid to undergo particle enrichment. Thus, these tubes internally define the first compartment of the filtering apparatus.

Through the performance of the aforementioned processing or treatment cycle, the inventive process offers numerous advantages in connection with the processing of liquids and gases containing suspended particles.

Thus, through successively performing a particle enrichment stage and a particle depletion stage makes it possible to avoid clogging of the porous walls, by maintaining at an appropriate value the particle concentration of the fluid circulating in the filtering apparatus.

Moreover, said process makes it possible to obtain very advanced filtering, because it is merely necessary to choose the characteristics of the porous, permeable walls in order to obtain the desired filtering action.

Thus, the disadvantages of the prior art processes are avoided, i.e. the replacement of the filtering elements and the need to condition then in inert matrixes when they have been used for the treatment of fluids containing radioactive or toxic suspended particles. Moreover the volume of the radioactive or toxic waste to be treated is limited, because said waste is recovered in the form of a particle concentrate during the separating stage.

Furthermore, through preventing the clogging of the filtering apparatus, it is possible to carry out several processing cycles with stable operating characteristics for long periods.

The invention also relates to an apparatus for performing this process and which comprises:

a processing circuit successively comprising a filtering apparatus subdivided into first and second compartments by means of at least one porous, permeable wall having pores with sizes smaller than those of the particles, a particle separating device connected to the two ends of the first compartment of the filtering apparatus and means for permitting the circulation in the processing circuit of the fluid to be processed, means for introducing the fluid to be processed into the processing circuit, means for extracting a fluid which has diffused into the second compartment of the filtering apparatus and means for collecting the particles separated in the separating device.

In this apparatus, the means for circulating the fluid to be treated in the treatment circuit are arranged with respect to the means for introducing the fluid to be treated in such a way that the fluid successively circulates in the filtering apparatus and in the particle separating device or vice-versa.

Advantageously, the porous, permeable walls of the filtering apparatus are constituted by tubes, which internally define the first compartment. However, it is also possible to use other types of walls, e.g. porous plates.

The filtering apparatus used in the invention can be constituted by an ultrafiltration module having a plurality of porous tubes arranged parallel to one another, as in the modules used for the concentration and separation of the constituents present in a liquid.

The particle separating device can be constituted by a conventional device, e.g. an electrostatic filter, a dust separator operated by an impact or baffle action, a decanter, etc. Preferably, in the inventive process, use is made of a cyclone separator or a hydrocyclone, i.e. purely static apparatus using centrifugal force for extracting a particle-enriched fraction from a gaseous or liquid stream.

BRIEF DESCRIPTION OF THE DRAWINGS

The invention is described in greater detail hereinafter relative to non-limitative embodiments and the attached drawings, wherein show:

FIG. 1, a diagrammatic representation of a processing circuit according to the invention.

FIG. 3, a constructional variant of the installation of FIG. 2.

DETAILED DESCRIPTION OF PREFERRED EMBODIMENTS

Figure 2:
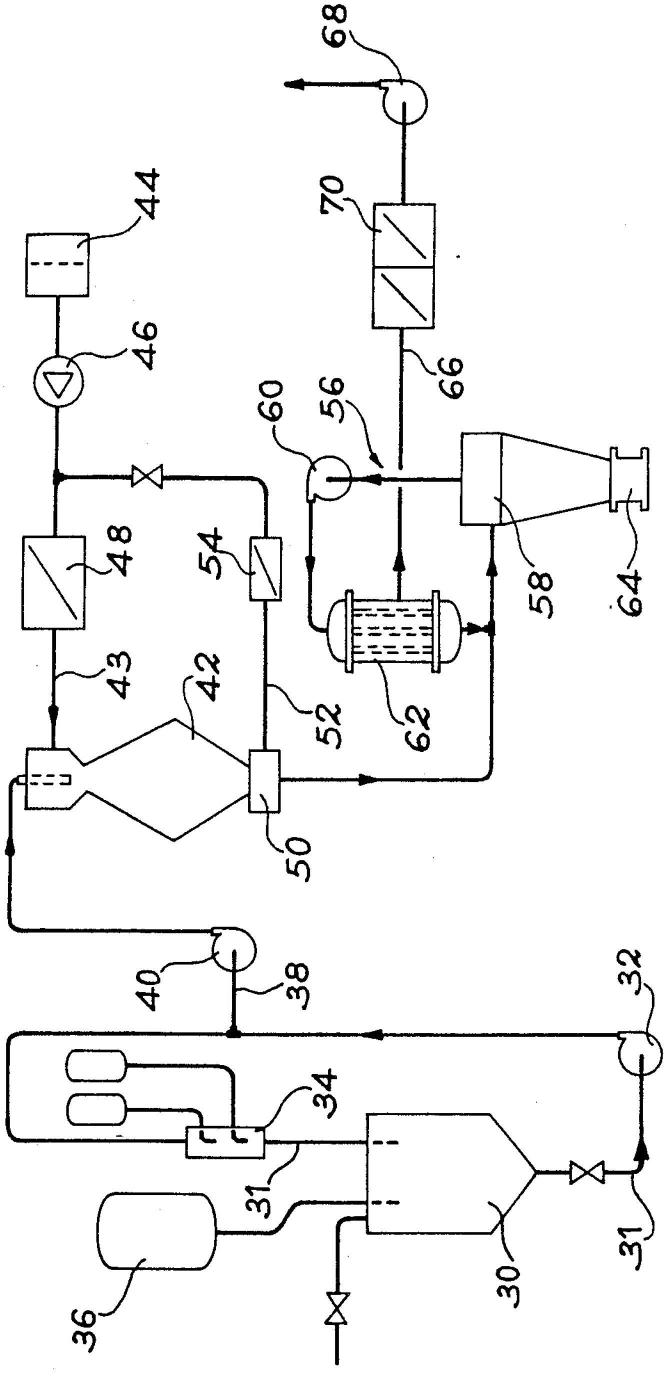
FIG. 2, an installation for drying radioactive liquid effluents using the inventive process for treating the fluid leaving the drying installation.

On referring to FIG. 1, it can be seen that the processing circuit 1 comprises a filtering apparatus 3 subdivided into a first compartment 3*a* and into a second compartment 3*b* by porous, permeable tubes 3*c* as well as a separating device 5 connected on the one hand to one of the ends of the first compartment 3*a* by a pipe 7 equipped with a valve 9 and on the other hand to the other end of the first compartment 3*a* by a pipe 11 provided with a valve 13 and a circulating pump 15.

The fluid to be treated or processed can be introduced into the treatment or processing circuit 1 by pipe 17 equipped with a valve 19. The fluid purified in the filtering apparatus 3 can be extracted by pipe 21 equipped with valve 23 and the particle separated in separating device 5 can be extracted by pipe 25.

The fluid to be treated, e.g. gas, is introduced into the processing circuit 1 by pipe 17 during operation. It is entrained by circulating pump 15 into the filtering apparatus 3, where a pressure difference is established between compartments 3*a* and 3*b*, so as to be able to extract from the apparatus purified gas using pipe 21 and particle-enriched gas through pipe 7. This enriched gas is then introduced into the separating device 5, which can be constituted by a cyclone separator, in which separation takes place of part of the particles from the gaseous stream, so as to deplete the same, whilst recycling through pipe 11 into filtering apparatus 3 gas whose particle concentration is not excessively high, so as to prevent clogging of porous tubes 3*c*. This gas undergoes a further processing cycle after adding fluid to be treated thereto by pipe 17.

In a constructional variant of said processing circuit, pipe 17 equipped with valve 19 is replaced by pipe 17' equipped with valve 19', shown in dotted line form, which makes it possible to introduce the fluid upstream of separating device 5, in order to commence the treatment cycle by the separating stage instead of by the filtering stage.

In this treatment circuit, the flow rates and pressures are regulated by valves 9, 13, 19 and 23 as a function of the nature of the fluid to be treated, so as to obtain in filtering apparatus 3 a high speed fluid outflow with considerable turbulence in tubes 3*c*, so as to prevent the deposition of particles on the tube walls. The flow introduced by valve 19 and pipe 17 essentially corresponds to the flow drawn off by pipe 21 equipped with valve 23.

In the same way, the porous tubes 3*c* used in the filtering apparatus are chosen as a function of the nature of the fluid to be treated. These porous tubes can be made from a metallic material, ceramic material, e.g. alumina, or a plastic material. It is also possible to use tubes having a macroporous support internally coated with a microporous layer, e.g. carbon tubes coated with a layer of $ZrO_2$. Tubes of this type are e.g. described in U.S. Pat. No. 4,341,631 and European Pat. No. 0,040,282. The characteristics of the tubes are also chosen as a function of the fluid to be processed. In general, use is made of tubes having mean pore radii of 0.01 to 5 $\mu$m and a high permeability.

The aforementioned processing circuit can be used for processing particle-containing liquids or gases. In exemplified manner are given hereinafter the operating conditions of a gas processing circuit and a liquid processing circuit.

PROCESSING CIRCUIT FOR PARTICLE-CONTAINING GASES

Porous metal tubes are used with an internal diameter of 15 mm, a thickness of 0.25 mm and a mean pore radius of 1 μm. A pressure difference of 10 kPa (100 mbars) is established between the two compartments of the filtering apparatus. Under these conditions, the diffused flow drawn off by pipe 21 can be 10 to 300 $m^3$/hour/$m^3$ of porous wall and the recirculation flow in pipe 7 represents approximately four times the diffused flow. The topping up flow of fluid to be treated introduced by pipe 17 corresponds to the diffused flow. Thus, an installation of this type is suitable for processing 10 to 300 mhd 3/h/$m^2$ of porous wall.

PROCESSING CIRCUIT FOR PARTICLE-CONTAINING LIQUIDS

In this case use is made of porous carbon tubes coated with a microporous zirconium layer, the tubes having an internal diameter of 6 mm, a thickness of 2 mm and the mean pore radius of the microporous layer is 0.01 μm.

When a pressure difference of 0.4 MPa (4 bars) is established between the two compartments of the ultrafiltration apparatus, it is possible to draw off by pipe 21, 250 1/h.$m^2$ of porous wall. In this case, the recirculation flow is 10 to 50 times the flow drawn off by pipe 21.

In the case where the processing circuit is intended for gases, the particle separating device 5 can be a cyclone, but the deconcentration in particles carried out by the cyclone varies as a function of the particle size. Thus, under established operating conditions, there is a certain enrichment of the recycled gas. Thus, in the case of 5 μm particles, the efficiency of a conventional cyclone is generally 50% and the enrichment of the gas with particle is at the most double the level of particles entering the circuit. When the suspended particles have dimensions of approximately 1 μm, the efficiency of the cyclone is generally 25% and the enrichment in this case corresponds to 4 times the initial level of the particles on entering the processing circuit. In the case where the processing circuit is intended for liquids, device 5 can be constituted by a hydroseparator or a hydrocyclone, which makes it possible to discharge sludge through pipe 25.

Figure 5:
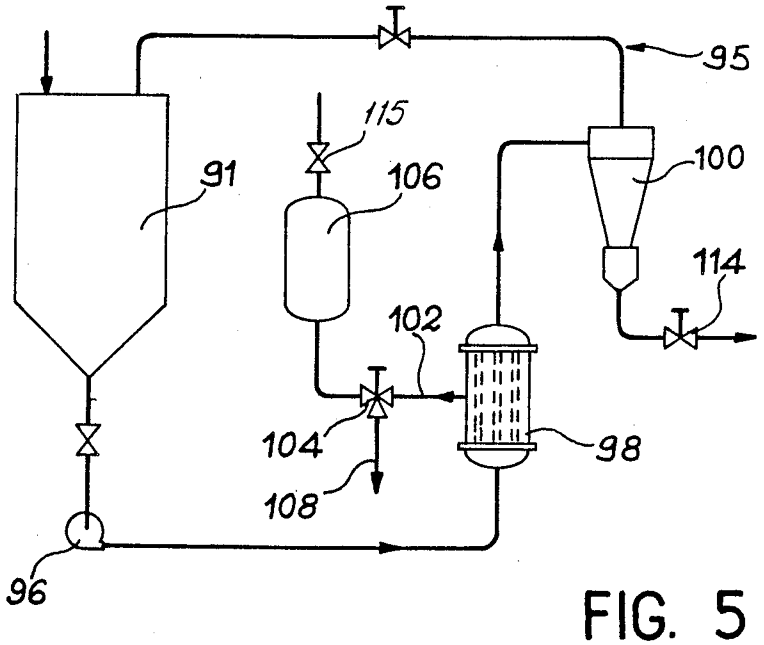
FIG. 5, a constructional variant of the installation shown in FIG. 4.

In the installation shown in FIG. 5, it is possible to use several filtering stages in series. It is also possible to use several apparatuses in series for separation purposes.

FIG. 2 shows an installation for the flash drying of radioactive effluents utilizing the inventive process. In this installation, the effluents to be treated are stored in tank 30, which is equipped with a pipe 31 and a circulating pump 32, an in line pH regulating system 34 and an insolubilization product injection device 36. A pipe 38, equipped with a volumetric pump 40 makes it possible to inject into a flash drying reactor 42 the effluents coming from tank 30. Into reactor 42 is introduced by pipe 43 hot air sucked in through a filter 44 by a blower 46 and is heated in a heater 48. Thus, in flash reactor 42 the liquid effluents are evaporated by hot air and are cooled in leaving the reactor in dilution box 50 by the cooling air introduce by pipe 52 after having been cooled in an exchanger 54. The mixture leaving the dilution box 50 is consequently constituted by air containing powder or particle and said mixture is then treated by the process according to the invention in circuit 56, equipped with a cyclone separator 58, a circulating fan or ventilator 60 and a filtering apparatus 62, the circulation direction in the processing circuit being indicated in the diagram. Thus, dust and powder-containing air is firstly introduced into cyclone 58, where part of the powder or dust is separated and collected in lock 64, whilst the particle-depleted gas is taken up again by fan 60, introduced into the filtering apparatus 62, from which purified air is discharge by pipe 66, the particle-enriched air being recycled into cyclone 58 with a topping up of dust-laden air from the flash reactor 42. The purified air leaving the filtering apparatus through pipe 66 is sucked in by pump 68 and can be discharged into the atmosphere after passing through safety filters 70.

Thus, this installation makes it possible to directly convert liquid effluents into powder, which is directly introduced by the inventive process into a waste conditioning installation. Thus, it possible to limit the volume of waste and their continuous conditioning takes place under satisfactory conditions.

FIG. 3 shows a constructional variant of the installation of FIG. 2 and the same references are used for designating the same components in two installations. In this variant, the air stream containing radioactive dust and powder from the dilution box 50 is firstly introduced into a cyclone 57, within which part of the solids is separated at 59. The gas flow leaving the hydrocyclone is then introduced in to the treatment circuit 56 by pipe 61 and is circulated by fan 60 in filtering apparatus 62 and then in cyclone separator 58. The gaseous stream leaving the cyclone separator is recycled by fan 60 into filtering apparatus 62. A purified gas flow is extracted from filtering apparatus 62. The solid particles separated in cyclone separator 58 can be recycled by pipe 80 into dilution box 50 by means of an air flow, which constitutes the cooling air and which is sucked in by fan 81 through filter 83.

In this variant of the installation, use is made of a first cyclone 57 for separating most of the particles from drying reactor 42 and use is then made of the inventive process, namely circuit 56 comprising cyclone 58 and filtering apparatus 62 for purifying the gas and discharging purified gas through pipe 66.

Figure 4:
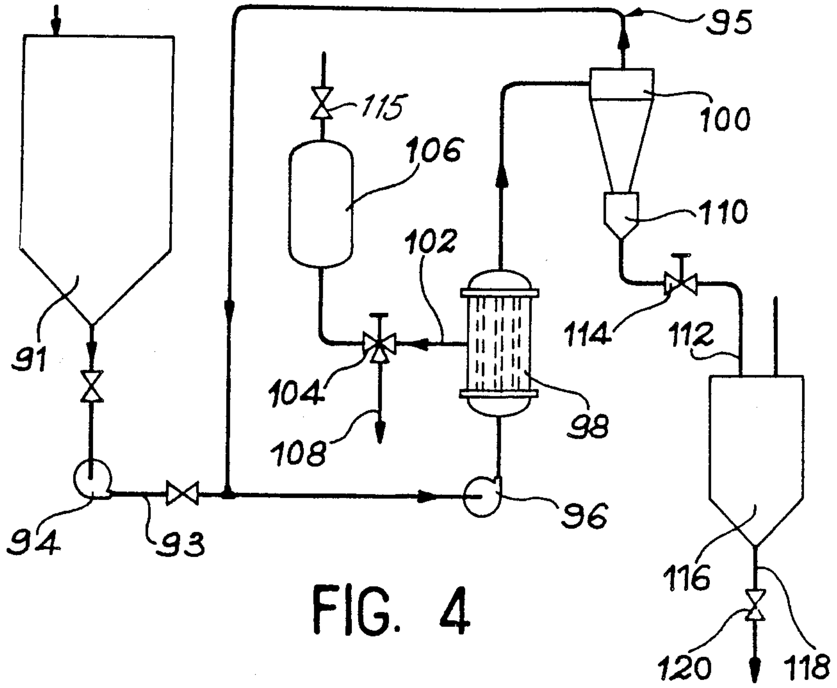
FIG. 4, a diagrammatic representation of an installation for the treatment of radioactive liquid effluents using the inventive process.

FIG. 4 shows an installation for the processing of liquids containing radioactive particles. This installation comprises a tank 91 for storing the liquid to be treated connected by a pipe 93 equipped with a pump 94 to a processing circuit 95, incorporating a circulating pump 96, a filtering apparatus 98 and a hydrocyclone 100. A pipe 102 makes it possible to extract the purified liquid leaving filtering apparatus 98 and it is connected via a two-way valve 104, either to a compressed air accumulator 106, or to a pipe 108 for discharging the purified liquid. The sludge separated in hydrocyclone 100 can be stored in the storage container 110 and then discharge by pipe 112, equipped with a valve 114 into a storage tank 116, which can be connected by a pipe 118, equipped with a valve 120 to a waste coating or drying installation.

In this installation, the liquid to be treated is firstly subjected to filtration in filtering apparatus 98 and then to the separation of the solid particles contained in the concentrated liquid in hydrocyclone 100. The deconcentrated liquid leaving hydrocyclone 100 is recycled with the liquid to be treated by pump 96 into filtering apparatus 98. At regular intervals, valve 104 is tilted or switched to link pipe 102 with compressed air accumulator 106 and valve 115 is simultaneously opened. This makes it possible to ensure a brief countercurrent through the porous tubes of apparatus 98 and to detach the polarization layer, which would tend to slow down the flow within the tubes of the apparatus. Following this operation, which lasts for a very short time, valve 104 is returned to its initial position, before closing valve 115 for refilling accumulator 106. These operations are repeated at regular intervals by means of a timer.

FIG. 5 shows a constructional variant of the installation of FIG. 4, in which tank 91 forms part of the processing circuit 95. Thus, the liquid to be processed, which is located in tank 91, is introduced and circulated by pump 96 in filtering apparatus 98 and then hydrocyclone 100. The deconcentrated liquid leaving hydrocyclone 100 is recycled by means of storage tank 91 into filtering apparatus 98. In this case, there is also a compressed air accumulator 106 connected via a two-way valve 104 to extraction pipe 102 for the purified liquid and use is also made of a timer for tilting the valve 104 at regular intervals and for opening valve 115, which was closed just before tilting valve 104, so as to once again ensure the refilling of the accumulator.

The above-described installations clearly show the interest of the inventive process for the treatment of radioactive or toxic liquids and gases. This process is also highly advantageous for the treatment of non-radioactive fluids and in particular dust-laden gases.

What is claimed is:

1. A process for filtering a fluid containing suspended particles, wherein the fluid is filtered through a filtering apparatus having pores which restrict the passage of the particles comprising the steps of:

(a) continuously separating part of the particles present in the fluid to be processed in order to reduce the number of particles therein, (b) circulating the resulting fluid of step (a) in a filtering apparatus subdivided into first and second compartments by at least one porous, permeable wall having pores with dimensions smaller than those of the particles, so that at an outlet from said first compartment particle-enriched fluid is obtained and purified fluid is diffused into the second compartment, (c) recovering the purified fluid which has diffused into the second compartment and (d) recycling the particle-enriched fluid leaving the first compartment with separation of a part of the particles therein in order to subject it to further processing in said first compartment with the fluid to be processed in order to control the particle concentration in the first compartment and reduce the tendency to clog said pores with particles.

2. A process for filtering a fluid containing suspended particles, wherein the fluid is filtered through a filtering apparatus having pores which restrict the passage of the particles of the process comprising the steps of:

(a') circulating the fluid to be processed in a filtering apparatus subdivided into first and second compartments by at least one porous, permeable wall having pores with dimensions smaller than those of the particles, so that at an outlet of said first compartment particle-enriched fluid is obtained and purified fluid is diffused into the second compartment, (b') recovering the purified fluid which has diffused into the second compartment, (c') continuously separating part of the particles present in the fluid leaving the first compartment in order to bring about particle depletion of the fluid and (d') recycling the thus depleted fluid in order to subject it to further processing in said first compartment with the fluid to be processed in order to control the particle concentration in the first compartment and reduce the tendency to clog said pores with particles.

3. A process according to claims 1 or 2, wherein the porous, permeable walls are constituted by tubes internally defining the first compartment of the filtering apparatus.

4. A process according to claims 1 or 2, wherein the fluid is a gas.

5. A process according to claims 1 or 2, wherein the fluid is a particle-laden gas from a liquid radioactive effluent drying installation.

6. A process according to claims 1 or 2, wherein the fluid is a liquid.

7. A process according to claims 1 or 2, wherein said pores have a mean pore radius of from about 0.01 to 5 $\mu$m.

* * * * *